US012611998B2

(12) United States Patent
Holzleitner et al.

(10) Patent No.: US 12,611,998 B2
(45) Date of Patent: Apr. 28, 2026

(54) PLASTIC COVER COMPRISING A COATING LAYER

(71) Applicant: Bayerische Motoren Werke Aktiengesellschaft, Munich (DE)

(72) Inventors: Jochen Holzleitner, Ergolding (DE); Martin Schneebauer, Munich (DE); Frauke Thienel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1410 days.

(21) Appl. No.: 17/260,488

(22) PCT Filed: Jun. 4, 2019

(86) PCT No.: PCT/EP2019/064523
§ 371 (c)(1),
(2) Date: Jan. 14, 2021

(87) PCT Pub. No.: WO2020/038622
PCT Pub. Date: Feb. 27, 2020

(65) Prior Publication Data
US 2021/0316671 A1 Oct. 14, 2021

(30) Foreign Application Priority Data
Aug. 20, 2018 (DE) .................... 10 2018 213 972.5

(51) Int. Cl.
B60R 13/02 (2006.01)
B29C 45/16 (2006.01)
(Continued)

(52) U.S. Cl.
CPC ........ B60R 13/025 (2013.01); B29C 45/1615 (2013.01); B32B 3/30 (2013.01);
(Continued)

(58) Field of Classification Search
CPC ..... B60R 13/025; B29C 45/1615; B32B 3/30; B32B 27/08; B32B 27/40;
(Continued)

(56) References Cited

U.S. PATENT DOCUMENTS

2008/0117513 A1* 5/2008 Hsu ...................... G02B 5/0242
264/1.29
2008/0130118 A1 6/2008 Hsu et al.
(Continued)

FOREIGN PATENT DOCUMENTS

CN 101191866 A 6/2008
CN 102120877 A * 7/2011
(Continued)

OTHER PUBLICATIONS

DE-202014101678-U1 Translation (Year: 2015).*
(Continued)

*Primary Examiner* — Travis M Figg
(74) *Attorney, Agent, or Firm* — Crowell & Moring LLP

(57) ABSTRACT

A plastics cover for a motor vehicle includes a visible side, an inner side, and a carrier side. The carrier layer is composed of a transparent polymer material, which has a continuous and constant basic wall thickness and at least one of an arrow-shaped, tetrahedral, pyramidal, conical, or cuboidal recess at which at least one wall thickness variation is formed on the inner side of the carrier layer. The finishing layer which is arranged on a visible surface of the carrier layer. The finishing layer comprises a transparent polymer material.

13 Claims, 3 Drawing Sheets

(51) Int. Cl.

| | |
|---|---|
| *B29K 75/00* | (2006.01) |
| *B29L 31/30* | (2006.01) |
| *B32B 3/30* | (2006.01) |
| *B32B 27/08* | (2006.01) |
| *B32B 27/40* | (2006.01) |

(52) U.S. Cl.
    CPC .............. *B32B 27/08* (2013.01); *B32B 27/40* (2013.01); *B29K 2075/00* (2013.01); *B29K 2995/0026* (2013.01); *B29L 2031/3005* (2013.01); *B32B 2307/412* (2013.01); *B32B 2307/732* (2013.01); *B32B 2605/006* (2013.01)

(58) Field of Classification Search
    CPC ........ B32B 2307/412; B32B 2307/732; B32B 2605/006; B29K 2075/00; B29K 2995/0026; B29L 2031/3005
    See application file for complete search history.

(56) References Cited

U.S. PATENT DOCUMENTS

| | | | | |
|---|---|---|---|---|
| 2009/0085235 | A1 | 4/2009 | Burkle et al. | |
| 2016/0236451 | A1 | 8/2016 | Wokoeck et al. | |
| 2016/0304737 | A1* | 10/2016 | Kang ..................... | B05D 3/067 |
| 2017/0352938 | A1* | 12/2017 | Okumura ............... | H01Q 1/425 |
| 2019/0084285 | A1 | 3/2019 | Weissenberger | |
| 2019/0143909 | A1* | 5/2019 | Mayer Pujadas ....... | C23C 14/35 342/70 |
| 2021/0159592 | A1* | 5/2021 | Kawashima .............. | G01S 7/03 |
| 2021/0316671 | A1 | 10/2021 | Holzleitner et al. | |

FOREIGN PATENT DOCUMENTS

| | | | | | |
|---|---|---|---|---|---|
| CN | 107444289 | A | 12/2017 | | |
| DE | 10 2006 046 436 | B3 | 4/2008 | | |
| DE | 20 2007 016 053 | U1 | 1/2009 | | |
| DE | 10 2013 016 325 | A1 | 4/2015 | | |
| DE | 202014101678 | U1 * | 4/2015 | ............ | B60R 13/02 |
| DE | 10 2013 223 649 | A1 | 5/2015 | | |
| DE | 10 2014 210 034 | A1 | 11/2015 | | |
| DE | 10 2016 214 805 | A1 | 2/2018 | | |
| DE | 10 2018 213 972 | A1 | 2/2020 | | |
| EP | 1 705 152 | A2 | 9/2006 | | |
| EP | 3 252 494 | A1 | 12/2017 | | |
| WO | WO 2017/215840 | A1 | 12/2017 | | |
| WO | WO 2020/038622 | A1 | 2/2020 | | |

OTHER PUBLICATIONS

Chinese-language Office Action issued in Chinese Application No. 201980040167.1 dated Mar. 29, 2023 with English translation (12 pages).

German-language Third Party Submission issued in German Application No. 10 2018 213 972.5 dated Sep. 30, 2020 (16 pages).

Chinese-language Office Action issued in Chinese Application No. 201980040167.1 dated Jan. 27, 2022 with English translation (15 pages).

International Search Report (PCT/ISA/210) issued in PCT Application No. PCT/EP2019/064523 dated Aug. 8, 2019 with English translation (five (5) pages).

German-language Written Opinion (PCT/ISA/237) issued in PCT Application No. PCT/EP2019/064523 dated Aug. 8, 2019 (six (6) pages).

German-language Search Report issued in German Application No. 10 2018 213 972.5 dated May 29, 2019 with partial English translation (12 pages).

* cited by examiner a)             b)

c)             d)

PLASTIC COVER COMPRISING A COATING LAYER

BACKGROUND AND SUMMARY OF THE INVENTION

This disclosure relates to a plastics cover having a visible side and an inner side, and also to a method for producing such a plastics cover.

This disclosure is described below using the example of exterior covers for motor vehicles, although it can be used per se independently of the use of the plastics cover.

For various regions of the outer shell of motor vehicles, use is increasingly made of plastics covers, for example instead of previously used metal sheet parts. In order to generate a high-quality visual impression of the plastics cover used, said covers are embodied in part such that their surface does not have a mono-color effect but rather is for example perceived by the observer to be decorated and/or to have a kind of 3D visual appearance. Such plastics covers frequently have a carrier layer which gives the plastics cover its solid physical structure.

In order to improve the visual appearance, one approach, for example, is to adhesively bond a suitably machined film structure, possibly having a plurality of layers, onto the carrier layer on a visible side.

Another approach is the so-called behind-glass design, that is to say the use of a transparent carrier layer, in which a suitably structured film and/or a PVD coating (PVD=physical vapor deposition) are/is applied, possibly in a combined manner, on an inner side of the carrier layer in order to accentuate the visual appearance. To realize a 3D visual appearance, pyramidal recesses can be provided for example proceeding from an inner surface on the inner side of the carrier layer, said recesses, in conjunction with a PVD coating, reflecting incident light in such a way that a three-dimensional effect (in particular a depth effect) is produced for the observer.

The creation of such plastics covers composed of transparent polymers frequently takes place for example in an injection-molding tool and has to be carried out in accordance with plastics technology design guidelines in order to be able to generate components which have no, or barely visible, surface defects (such as, for example, sink marks or weld lines).

A vehicle cover and an injection-molding process for producing a vehicle cover may have a multi-layered laminate construction, wherein a high-gloss layer and a carrier layer are injection-molded as separate plastics components in two independent process steps and are connected to one another in a materially bonded manner in the following joining step. A reduced material thickness of the high-gloss layer is sought in this way.

However, for the production of a plastics cover which has a transparent carrier layer and a three-dimensional depth effect, it is necessary for the carrier layer to have wall thickness variations, for example in the form of recesses, which extend from an inner surface of the carrier layer to a visible surface. These wall thickness variations cause surface unevennesses on the visible side, which could be compensated only with difficulty by the method presented above.

A subsequent protective lacquer, as is often applied on the visible side for example in the form of a curtain-coating lacquer or a spray-coating lacquer for protection against UV aging and/or scratches, also cannot remedy the surface unevennesses; quite the contrary, the previously introduced imperfections become even more clearly apparent.

Against this background, it is one object of this disclosure to improve a plastics cover with a transparent carrier layer having wall thickness variations.

This object and other objects are achieved by the inventive plastics cover disclosed therein.

This disclosure is then based, inter alia, on the concept of using a hard-wearing plastics material as finishing layer instead of a conventional lacquer, said plastics material being applied, for example in a second injection process or by flow-coating, onto the visible side of the carrier layer, with this step taking place downstream, in particular immediately downstream, of the first injection process for producing the carrier layer. Of course, the two steps can also be performed with a greater time delay. In any case, small surface unevennesses or discontinuities of the carrier layer on the visible side of the carrier layer can thus be compensated by means of the applied finishing layer.

The use, for example, of an inviscid polyurethane (PUR) constituent as finishing layer makes it possible to achieve very small layer thicknesses in the order of magnitude of 0.2 to 1.5 mm and to conceal sink marks in the carrier layer. The maximum size of concealable sink marks lies in the order of magnitude of 100 $\mu$m and is also dependent on the wall thickness used for the finishing layer.

As a result of the saving on a subsequent lacquer as finishing layer, costs for the lacquering installation which would otherwise be required are additionally reduced. However, more elaborate injection-molding and more complex tooling are also required in order to be able to produce the carrier layer in an injection unit and subsequently coat said carrier layer with the finishing layer.

The direct coating makes it possible to reduce the risk of influences, since the coating process can possibly take place completely in the closed tool.

If a polyurethane material is used for the finishing layer, the compensating action of the PUR system makes it possible to increase the freedom with regard to shaping of the plastics parts which are produced in this method. The PUR system also has a self-healing effect, which makes it possible to cause scratches to disappear from the surface again after a certain restoration time and/or in a reinforced manner by means of the action of heat. This can entail increased added value for customers, since the motor vehicle, as a result of the flawless appearance of the visible side of the plastics cover, exhibits a high-quality impression for a longer period of time. Furthermore, the quality of the surface coating, in particular in comparison with spray-coating lacquers, is of significantly higher quality since no surface waviness (orange peel effect) or fat edges at component borders are produced in the method.

According to a first aspect of the disclosure, a plastics cover for a motor vehicle is provided, the plastics cover being in particular an exterior cover, for example a front cover, a ventilation grille, a B pillar cover or a rear cover. The plastics cover has at least:

a) a visible side and an inner side, the visible side facing the observer in particular in an assembled state of the plastics cover.

b) a carrier layer composed of a transparent polymer material, in particular with a thermoplastic polycarbonate (PC), the carrier layer having a continuous, in particular constant, basic wall thickness and at least one in particular tetrahedral, arrow-shaped, pyramidal, conical or cuboidal recess at which at least one wall thickness variation is formed on the inner side of the carrier layer, that is to say the carrier layer at said point has in particular a non-continuous wall thickness development, and therefore a wall thickness of the carrier layer in the region of the recess is smaller than the basic wall thickness.

c) a finishing layer which is arranged, in particular applied without macroscopic interspace, on the visible side, in particular on a visible surface, the finishing layer comprising a transparent polymer material, in particular a PUR material.

In order to support the compensation of unevennesses on the visible surface of the carrier layer, according to one embodiment, the finishing layer, on the inner side thereof, follows the shape of a defect site, in particular a discontinuity or unevenness, in a visible surface of the carrier layer but has in particular a continuous visible side. To this end, the injection mold for producing the visible side of the finishing layer is in particular configured in a continuous manner at least with regard to the mold surface thereof.

In particular, in order to be able to make use of the self-healing effect of PUR systems with respect to scratches, according to one embodiment, the transparent polymer material of the finishing layer comprises a polyurethane. In particular, use is made of a PUR material which can be processed in inviscid form during injection molding in order to ensure exact and interspace-free molding of the finishing layer onto the carrier layer.

According to a further aspect of the disclosure, a method for producing a plastics cover according to one embodiment of the disclosure is provided. The method has at least the following method steps: i) injection-molding a carrier layer composed of a first transparent polymer material; ii) injection-molding or flow-coating a finishing layer composed of a second transparent polymer material directly onto a visible side of the carrier layer.

In the present case, the term "transparent" refers in particular to constituent parts or materials of the plastics cover which have a transmission of incident light in the visible range of greater than 70%. In the present case, the term "opaque" refers in particular to constituent parts or materials of the plastics cover which have a transmission of incident light in the visible range of less than 30%.

In the present case, a continuous profile of a wall thickness is in particular understood to mean that the wall thickness along the extent of a side surface of a layer component, such as, for example, of the carrier layer, only changes to such an extent that the change function (=derivation of the wall thickness) is defined over the entire extent.

In order to permit a flexible design of the plastics cover, according to one embodiment, the carrier layer is doubly curved.

According to one embodiment, the carrier layer has at least one accented region in which the wall thickness is smaller than a basic wall thickness, in particular because a recess is arranged there, which entails a wall thickness variation. As a result, when the plastics cover is observed from the visible side, a three-dimensional visual effect, such as, for example, a depth effect, can be conveyed to the observer.

In particular, according to one embodiment, the accented region has an in particular arrow-shaped, tetrahedral, pyramidal, conical or cuboidal recess, proceeding from the inner surface of the carrier layer. A particularly good three-dimensional visual effect, such as, for example, a depth effect, can thus be obtained. In particular, the wall thickness in the region of the recess is smaller than in the surroundings of the recess, where the carrier layer has in particular a basic wall thickness.

In the present case, a basic wall thickness of the carrier layer is understood to mean in particular that wall thickness which the carrier layer has at a particular point in the surroundings of a recess, in particular of an accented region.

According to one embodiment, for an areal depth effect, the carrier layer has a multiplicity of recesses which are distributed in particular in a regular manner, for example in a uniform manner.

In order to keep weight and costs of the plastics cover low, according to one embodiment, the finishing layer has a wall thickness of 0.2 to 1.5 mm, in particular of 0.3 to 0.5 mm.

For adaptation of the visual effect, in particular of the depth effect, according to various embodiments, provision is made for a masking layer and/or an inner top layer which are/is arranged on the inner side of the carrier layer. The masking layer can be applied on an inner surface of the carrier layer (in particular beyond the recesses) for example by way of a color-imparting coating, such as, for example, preferably a suitable film and/or by printing a masking region. The inner top layer can for example be lacquer-coated, painted and/or can be applied by means of a PVD (physical vapor deposition) process for adaptation of the visual effect according to various embodiments.

In order to be able to compensate for resulting surface defects on the visible side of the carrier layer, according to one embodiment, the production method is performed in such a way that the carrier layer at least partially cures before the finishing layer is molded (on).

In order to be able to produce the plastics cover with simple tools, according to one embodiment, the carrier layer is molded in a first cavity and the finishing layer is molded in a second cavity. In particular, the tool is composed of at least three tool halves, two tool halves forming the first cavity, and the third tool half in turn being assigned to the first tool half, such that the second cavity is formed. After the tool has been opened, the carrier layer then remains in the second tool half and is not removed from the tool.

In order to be able to produce the plastics cover as rapidly as possible, according to one embodiment, after the carrier layer has been molded, a mold wall of an injection-molding cavity, at which wall the visible side of the carrier layer is formed, is set back, in particular by the desired wall thickness of the finishing layer, and the second polymer material is subsequently injected.

In order to be able to use a standard injection-molding tool with one molding step, according to one embodiment, the carrier layer is produced in a separate injection-molding tool on an injection-molding machine and is subsequently inserted into a further tool and overmolded with an inviscid polyurethane polymer.

Further advantages and use possibilities of the disclosure emerge from the following description in connection with the figures, in which:

DETAILED DESCRIPTION OF THE DRAWINGS

Figures 1, 2:
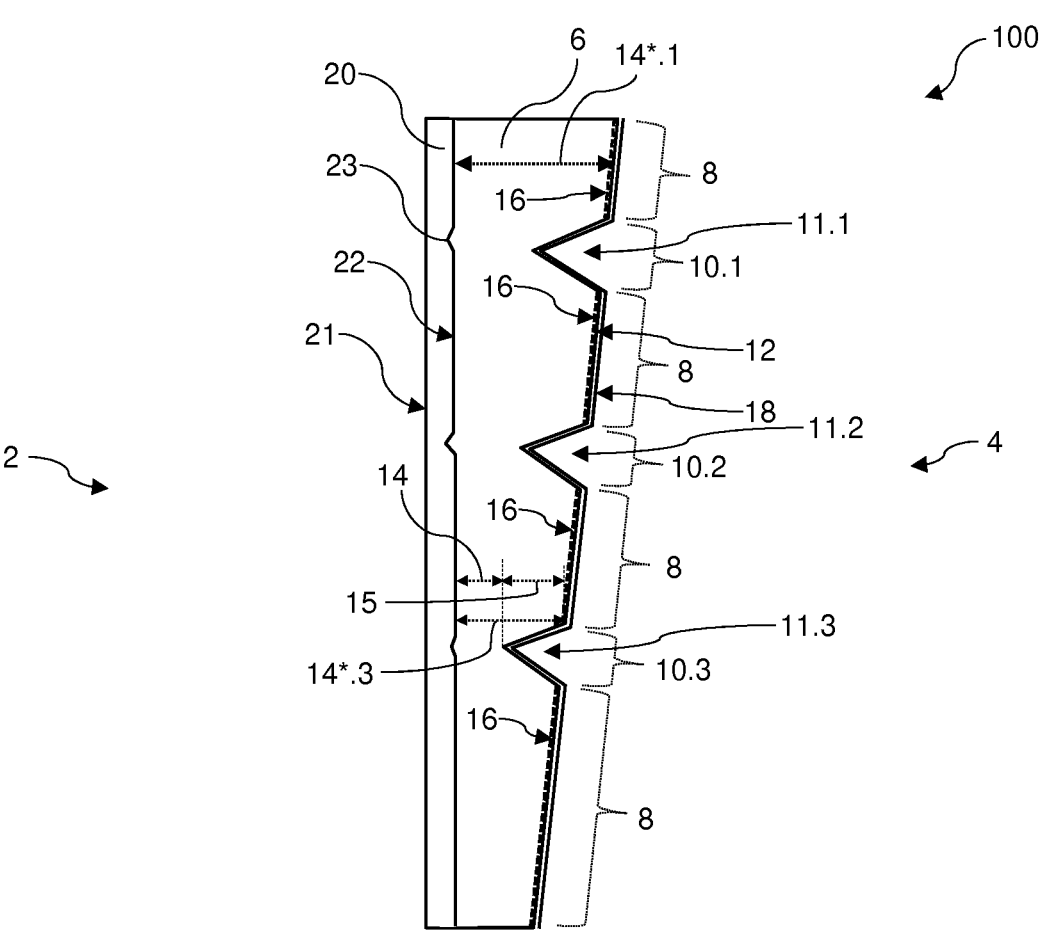
FIG. 1 schematically shows a detail of a cross section of a plastics cover.
FIG. 2 schematically shows a cross section of a plastics cover.

FIG. 1 illustrates a cross section of a plastics cover 1, such that a visible side 2 is illustrated on the left and an inner side 4 of the plastics cover 1 is illustrated on the right. The plastics cover 1 has a carrier layer 6 composed of a transparent, thermoplastic polycarbonate (PC).

FIG. 1 shows only the surroundings of a recess 11 in the carrier layer 6, said recess extending from an inner surface 12 of the carrier layer 6 into the layer body thereof. Beyond the recess 11, the carrier layer 6 has a basic wall thickness 14*. The recess 11 itself projects into the layer body insofar as the latter has a minimum wall thickness 14 in the region of the recess. At the recess 11, a wall thickness variation 15 is thus produced from the difference between the basic wall thickness 14* and the minimum wall thickness 14. At the wall thickness variation 15, the wall thickness development is not continuous but rather is abrupt.

As a result of the recess 11, the carrier layer 6 may have, on the visible side 2, a schematically illustrated, minimum unevenness of a visible surface 22 (collectively referred to as defect site 23).

On the visible side 2 of the carrier layer 6, there is arranged a transparent finishing layer 20 which not only protects a visible surface 22 of the carrier layer against wear but also compensates for the defect sites 23. In the exemplary embodiment, the finishing layer 20 is formed of a transparent polyurethane material which compensates for any existing defect site 23 and which, for its part, has a continuous, in particular a flat and/or smooth, visible surface 21.

Typically, the finishing layer 20 is 0.3 to 0.5 mm thick, particularly if the basic wall thickness 14* of the carrier layer 6 is and/or ranges between 3 and 6 mm, which represents a typical basic wall thickness range for the carrier layer 6 of exterior covers in the case of motor vehicles.

In spite of the simplified schematic illustration of FIG. 1, the carrier layer 6, in its entirety or in partial regions, can be of singly or doubly curved configuration. The carrier layer can also have a constant or a continuous basic wall thickness 14*.

FIG. 2 illustrates a cross section of a plastics cover 100, such that a visible side 2 is illustrated on the left and an inner side 4 of the plastics cover 100 is illustrated on the right.

The plastics cover 100 has a carrier layer 6 composed of a transparent, thermoplastic polycarbonate (PC).

On the visible side 2 of the carrier layer 6, there is arranged a transparent finishing layer 20 which protects a visible surface 22 of the carrier layer against wear. In the exemplary embodiment, the finishing layer 20 is formed of a transparent polyurethane material which compensates for any existing defect sites 23 and which, for its part, has a continuous, in particular a flat and/or smooth, visible surface 21.

On the inner side 4 thereof, the carrier layer 6 of the plastics cover 100 has a masking region 8 and a plurality of mutually spaced-apart accented regions 10. The masking region 8 and the accented regions 10 together form an inner surface 12 of the carrier layer 6 (or at least a part thereof).

In spite of the simplified schematic illustration of FIG. 2, the carrier layer 6, in its entirety or in partial regions, can be of singly or doubly curved configuration. The carrier layer can also have a constant or a continuous basic wall thickness 14*.

The masking region 8 is arranged on that partial region of the inner surface 12 which has the basic wall thickness 14*. Each of the accented regions 10 is arranged on a partial region of the inner surface 12, in which partial region a wall thickness 14 is configured to be smaller than the basic wall thickness 14* at said point of the carrier layer 6, in particular with a non-continuous wall thickness variation 15.

In the exemplary embodiment illustrated, each accented region 10 has a tetrahedral recess 11 which proceeds from the inner surface 12 of the carrier layer 6. As a result of the tetrahedral recesses 11, the carrier layer 6 may have, on the visible side 2, schematically illustrated defect sites 23 of a visible surface 22.

On that part of the inner surface 12 on which the masking region 8 is configured, the plastics cover 100 has a masking layer 16 which is formed by means of a film or by means of a printing ink which is applied directly onto the inner surface 12. Substantially no masking layer is configured in the accented regions 10.

An opaque inner top layer 18 is arranged on the entire inner surface 12—that is to say on the masking region 8 and on the accented regions 10—on the inner side, said top layer being applied by means of a PVD process in the exemplary embodiment.

The regions 8 and 10 are not absolutely necessary for compensating for the defect site 23 and thus are only shown as a typical but optional design variant in the present exemplary embodiment.

On the visible side 2 of the carrier layer 6, there is arranged a transparent finishing layer 20 which protects a visible surface 22 of the carrier layer against wear and environmental influences. In the exemplary embodiment, the finishing layer 20 is formed of a transparent polyurethane material which compensates for any existing defect sites 23 and which, for its part, has a smooth visible surface 21.

In the exemplary embodiment, all of the aforementioned layers—the finishing layer 20, the carrier layer 6, the masking layer 16 and the inner top layer 18—are configured to be free of metal or, if a metallic material is used, to be sufficiently thin that they have a suitably low electrical conductivity for a sensor-transparent design of the plastics cover 100. A sensor-transparent design is understood to mean in particular a low radar absorption, and also a low radar reflection, in the frequency band of 76-77 GHz, such that, for example, a radar sensor can be arranged behind the plastics cover and can monitor a sensor field in front of the plastics cover during operation.

FIGS. 3a-d schematically illustrate various steps of a method for producing a plastics cover 100 according to FIG. 2.

Figure 3:
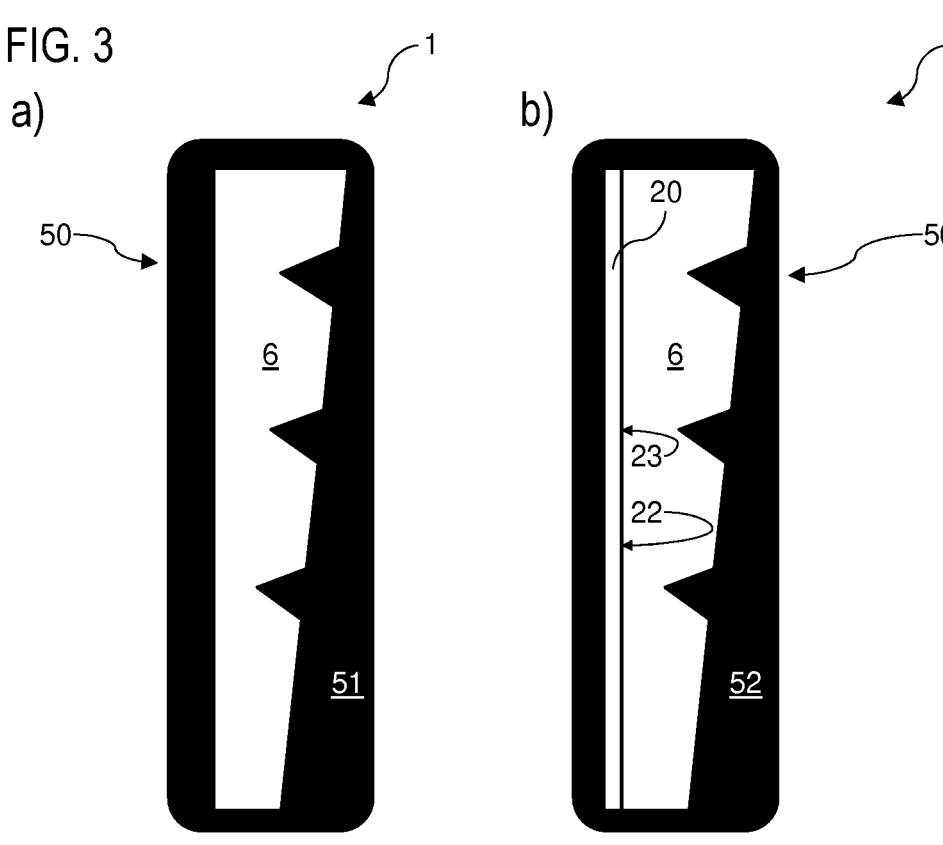
FIG. 3 schematically shows various steps of a method for producing a plastics cover according to FIG. 2.
Figure 3:
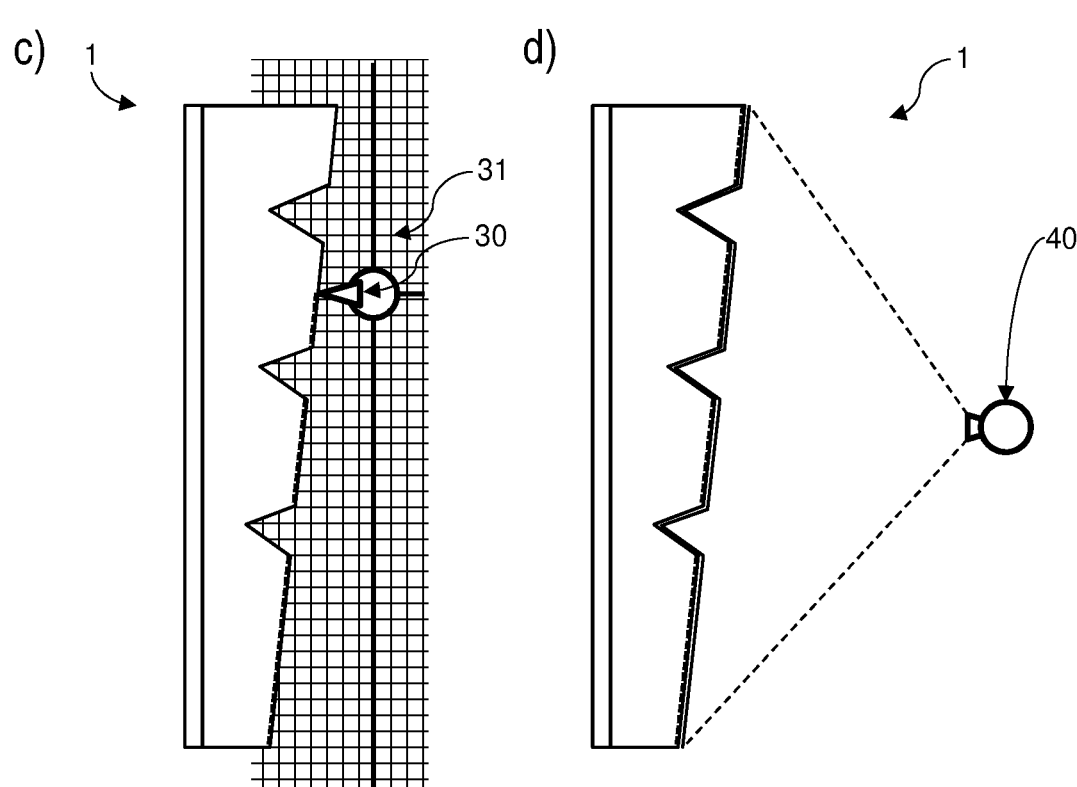

FIG. 3a shows a greatly simplified depiction of an injection-molding installation 50, which is represented in the illustration by a closed first mold 51. The first mold 51 represents a suitably designed negative of the desired shape of the carrier layer 6. During performance of the method, a PC material is injected into the mold and at least partially cured.

FIG. 3b illustrates a second mold 52 in the closed state, into which the sufficiently cured carrier layer 6, after having been molded itself, is inserted. In the second mold 52, for performance of the method, an inviscid PUR material is molded onto the visible surface 22 of the carrier layer 6. In this way, the defect sites 23 can be compensated.

The manufacturing steps described in FIG. 3c and FIG. 3b are necessary merely for typical plastics covers with depth effect but are not absolutely necessary for compensating for the defect site.

FIG. 3c illustrates a print head 30 which prints the masking layer 16 in the masking region 8, with the accented regions 10 being left out. The print head 30 is configured to be moved, along a schematically illustrated movement apparatus 31, along the inner surface 12 and in particular in the masking region 8 in a three-dimensional manner. As an alternative, the masking can also be applied by means of a film or a lacquer.

In FIG. 3d, the carrier layer 6 in the masking region 8 has been completely printed or completely covered with the film. On the inner surface 12, which has been printed in this way, of the carrier layer 6, the inner top layer 18 is applied by means of a PVD apparatus 40, the dissolved particles from the PVD apparatus 40 being deposited on said top layer, specifically both in the masking region 8 and in the accented regions 10.

Figure 4:
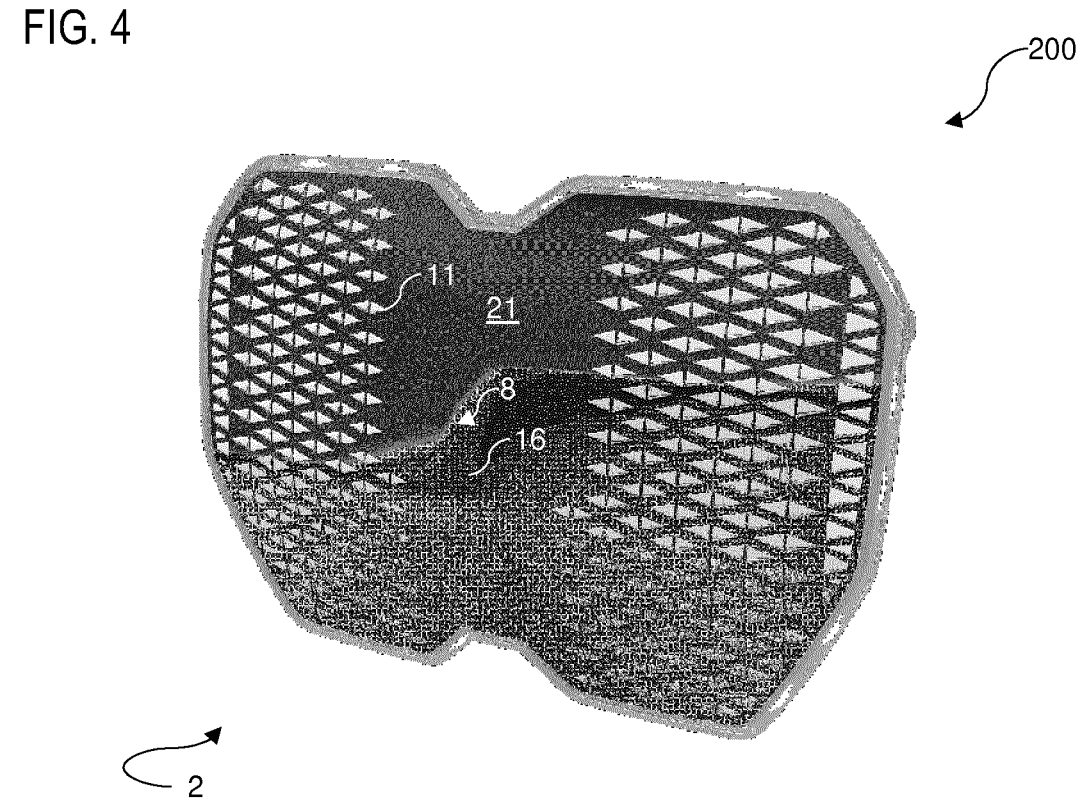
FIG. 4 shows an oblique view of a plastics cover.

FIG. 4 illustrates a front plastics cover 200 for a motor vehicle in an oblique view from the visible side 2, such that the observer is looking at the visible surface 21 of the finishing layer 20. In addition to the frame, the masking region 8 which has been printed with the masking layer 16 is illustrated, visible in black, said masking region appearing dark as a result of the printing ink.

Contrasting therewith are the recesses 11, in the respective accented region 10 of which no printing ink has been applied, such that the lighter inner top layer 18 reflects the incident light through the transparent carrier layer 6 around the transparent finishing layer 20. It is thus possible to obtain the visible three-dimensional more visual effect which, owing to the PUR finishing layer 20 molded onto the carrier layer, can appear to the observer to have no, or significantly fainter, visible defect sites 23.

Typically, the finishing layer 20 is 0.2 to 1.5 mm thick, particularly if the basic wall thickness 14* of the carrier layer 6 ranges between 3 and 6 mm. In relation thereto, the printed masking layer 16 and the (PVD-)sputtered inner top layer 18 have negligible layer thicknesses in the micrometer and/or nanometer range.

LIST OF REFERENCE DESIGNATIONS

1 Plastics cover
2 Visible side
4 Inner side
6 Carrier layer
8 Masking region
10 Accented region
11 Recess
12 Inner surface
14 Wall thickness
14* Basic wall thickness
15 Wall thickness variation
16 Masking layer
18 Inner top layer
20 Finishing layer
21 Visible surface of the finishing layer
22 Visible surface of the carrier layer
23 Defect site
30 Printing apparatus
31 Movement apparatus
40 PVD apparatus
50 Injection-molding installation
51 First mold

8

52 Second mold
100 Plastics cover
200 Front plastics cover of a motor vehicle

What is claimed is:

1. A plastics cover for a motor vehicle, comprising:
a visible side;
an inner side;
a carrier layer composed of a transparent polymer material, which has a continuous and constant basic wall thickness and at least one of an arrow-shaped, tetrahedral, pyramidal, conical, or cuboidal recess at which at least one wall thickness variation is formed on the inner side of the carrier layer; and
a finishing layer which is arranged on a visible surface of the carrier layer, wherein
the finishing layer comprises a transparent polymer material,
the transparent polymer material includes an inviscid polyurethane, and
the finishing layer is disposed directly onto the visible surface of the carrier layer without macroscopic interspace therebetween.

2. The plastics cover according to claim 1, wherein the finishing layer, on the inner side thereof, follows the shape of a defect site in the visible surface of the carrier layer but has a continuous visible side.

3. The plastics cover according to claim 1, wherein the finishing layer has a wall thickness of between 0.2 and 0.5 mm.

4. The plastics cover according to claim 3, wherein the carrier layer is doubly curved.

5. The plastics cover according to claim 4, further comprising: a masking layer and/or an inner top layer which are/is arranged on the inner side of the carrier layer.

6. The plastics cover according to claim 1, wherein the cuboidal recess comprises a rectangular footprint at the inner surface of the carrier layer and four sidewalls meeting one another at edges, the sidewalls being substantially orthogonal to the rectangular footprint.

7. The plastics cover according to claim 6, wherein the cuboidal recess further comprises a substantially planar recess bottom opposite the rectangular footprint.

8. The plastics cover according to claim 2, wherein the defect site comprises a localized depression, discontinuity, or surface unevenness on the visible surface of the carrier layer caused by the wall thickness variation in the region of the recess.

9. The plastics cover according to claim 2, wherein the finishing layer locally varies a thickness thereof in a region corresponding to the defect site to compensate the defect site such that the visible side of the finishing layer remains continuous, flat and/or smooth.

10. The plastics cover according to claim 5, wherein the masking layer comprises a film layer or an ink layer disposed on an inner surface of the carrier layer to form a masking region.

11. The plastics cover according to claim 10, wherein the masking layer is arranged on a partial region of the inner surface having the basic wall thickness, and wherein substantially no masking layer is configured in the accented regions that include the recesses.

12. The plastics cover according to claim 5, wherein the inner top layer is opaque and is arranged on the entire inner surface of the carrier layer including both a masking region and accented regions.

13. The plastics cover according to claim 12, wherein the inner top layer has a thickness in a micrometer range and/or a nanometer range.

* * * * *